United States Patent [19]

Tappe et al.

[11] 4,349,348
[45] Sep. 14, 1982

[54] PROCESS FOR PRINTING SYNTHETIC, HYDROPHOBIC FIBER MATERIAL

[75] Inventors: Horst Tappe, Dietzenbach; Horst Kindler, Frankfurt am Main; Kurt Roth, Hofheim; Hans-Jürgen Weyer, Frankfurt am Main, all of Fed. Rep. of Germany

[73] Assignee: Cassella Aktiengesellschaft, Frankfurt, Fed. Rep. of Germany

[21] Appl. No.: 264,715

[22] Filed: May 18, 1981

[30] Foreign Application Priority Data

May 23, 1980 [DE] Fed. Rep. of Germany ....... 3019739

[51] Int. Cl.³ .............................................. D06P 5/15
[52] U.S. Cl. ........................................... 8/464; 8/691
[58] Field of Search ............................................ 8/464

[56] References Cited

U.S. PATENT DOCUMENTS 3,787,178 1/1974 Renfrew ................................. 8/543
4,265,629 5/1981 Ribka et al. ............................. 8/451

Primary Examiner—Maria Parrish Tungol
Attorney, Agent, or Firm—Connolly and Hutz

[57] ABSTRACT

Improved textile materials are produced having white or variously colored designs on a colored substrate on textile materials containing hydrophobic, synthetic fibers by impregnating the materials with dye liquors containing dyeing and padding auxiliaries as well as dyestuffs dischargeable to white, drying or incipiently drying the impregnated materials and then printing a desired pattern onto the materials with a discharge reserve paste containing a discharging agent, and subsequently subjecting the materials to a heat treatment at temperatures from 100° to 230° C., the improvement comprises the dyestuffs dischargeable to white being dyestuffs of the formula

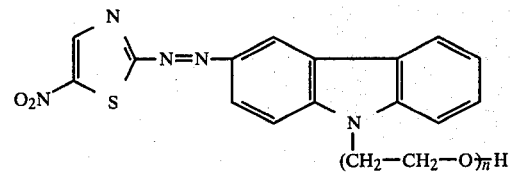

wherein n is a number from 1 to 9; and said discharging agent being a base which produces a pH value of at least 8 in a 5% strength aqueous solution.

8 Claims, No Drawings

PROCESS FOR PRINTING SYNTHETIC, HYDROPHOBIC FIBER MATERIAL

The present invention relates to a process for the production of discharge reserve prints on textile materials, particularly those containing to a preponderant extent hydrophobic fibres, particularly polyester fibres, or consisting of such fibres, by impregnating the materials with dye liquors containing, in addition customary dyeing and padding auxiliaries, dyestuffs which are dischargeable to white and, if appropriate, dyestuffs which are resistant to discharging agents, drying or incipiently drying the padded materials and then printing on a discharge reserve paste, which, in addition to the discharging agent, also contains, if desired, dyestuffs which are resistant to discharging agents, and subsequently subjecting the materials to a heat treatment at temperatures from 100° to 230° C., the dyestuffs dischargeable to white which are employed being the dyestuffs characterised in claim 1 by the formula I and the discharging agent which is employed being a base of the type indicated in claim 1.

In the field of textile printing, the production of white or coloured designs with sharp edges on a dark-coloured background has always been a problem. In particular, if it is desired to produce a filigree-like design on a dark substrate, direct printing of the textile material will not work at all. In order to produce such designs, it has been known for a long time to print a discharge paste in the desired pattern onto a deep background dyeing produced by means of a dyestuff dischargeable to white and then to destroy the dyestuff on the areas printed with the discharge paste by a dry or wet heat treatment. After the prints thus obtained have been washed out, the desired design is obtained as white on a dark ground. It is also already known to add to the discharge printing pastes dyestuffs which are resistant to the discharging agent. In this case, at the same time as the ground dyeing is destroyed, the textile material is dyed on the printed areas by means of the indestructible dyestuff. Coloured prints on a dark ground are obtained in this case. Coloured prints on a dark ground can also be obtained if the dark ground is produced using a mixture of a dischargeable dyestuff and a non-dischargeable dyestuff of another colour, by introducing both types of dyestuff into the padding liquor.

If these known processes are applied to synthetic fibre materials or textile materials which preferably consist of hydrophobic, synthetic fibres, a problem arises in that it is very difficult to discharge polyester fibres which have been dyed with, for example, disperse dyestuffs. Once disperse dyestuffs have been fixed, that is to say dissolved, in the polyester fibre, they are largely withdrawn from the reach of aqueous agents and thus also from attack by aqueous discharge pastes. In the production of discharge prints on textile materials containing or consisting of hydrophobic fibres, the known discharge printing process is, therefore, modified by first padding the textile material with a dye liquor containing disperse dyestuff and drying or incipiently drying it, but no fixing of the dyestuff, that is to say solution of the dyestuff in the hydrophobic fibre, must take place. The desired design is then printed on the dried or incipiently dried padded fabric by means of the discharge printing paste and the padded and printed fabric is then subjected to a heat treatment, in the course of which the ground dyestuff at the same time migrates into the polyester on the areas which have not been printed, that is to say it becomes fixed and the dyestuff is destroyed on the printed areas, that is to say no dyeing takes place. In view of this mechanism, this process is also described as discharge reserve printing.

The process of discharge reserve printing, which in itself is simple, contains a number of technical difficulties which frequently make its use difficult. Thus, it is usually not easy to destroy the ground dyestuff completely by means of the discharging agent. If this is not achieved, there remains on the discharged areas a coloured residue which has a hue capable of varying between yellow-brown and dull violet or reddish-tinged grey shades and which soils the white ground on the discharged areas. This produces white discharges with an untidy appearance or, in the event that a coloured discharge is to be produced, imparts a false shade to the dyestuff which is resistant to discharging agents. To overcome this difficulty, discharge pastes are used which contain relatively strong reducing agents or oxidising agents, such as, for example, sodium dithionite, in combination with an alkali, alkali metal formaldehydesulphoxylates or even heavy metal salts, such as, for example, tin-II chloride. Although it is usually possible to achieve a satisfactory white discharge print using such strong discharging agents, damage to the fibre material frequently occurs, particularly if the polyester fibre also contains accompanying fibres, such as, for example, cellulose fibres. Furthermore, these discharging agents are usually not cheap and, in the case of heavy metal discharging agents, they constitute an additional environmental pollution or cause additional outlay when the effluents are combined. In addition, there are only relatively few types of dyestuff which are resistant to such discharging agents and thus there is a relatively limited choice of dyestuffs which are resistant to discharging agents and which can be used for the production of coloured discharges.

Disperse dyestuffs for the background dyeing which can be discharged to a pure white by agents with the mildest possible action are required to overcome these difficulties. Disperse dyestuffs containing at least 2 esterified carboxyl groups in the molecule have been disclosed in German Offenlegungsschriften Nos. 2,612,740, 2,612,741, 2,612,742, 2,612,790, 2,612,791 and 2,612,792. Dyestuffs of this type are saponified when treated with aqueous alkalis, with the formation of alkali-soluble dyestuffs containing carboxyl groups. The use of dyestuffs of this type as disperse dyestuffs for dyeing polyester materials has the advantage that residues of dyestuff which have not been fixed can be washed off the textile material by a simple treatment with agents having an alkaline reaction. It is also known that residues of dyestuff which have not been fixed can be removed readily, by treating the fibre with alkali, from dyeings made with disperse dyestuffs containing pyridone derivatives as the coupling component. However, so far as pyridone dyestuffs are concerned, these dyestuffs, which are soluble in aqueous alkalis, have the disadvantage that they can essentially only be employed exclusively for yellow or reddish-tinged yellow shades; so far as dyestuffs containing esterified carboxyl groups are concerned, these dyestuffs have the disadvantage that, after the ester groups have been saponified, they have a certain affinity for hydrophilic fibres, such as, for example, wool, cotton or polyamide fibres, and stain or soil these fibres. In addition, the diazo or coupling components required for the manufacture of dyestuffs containing carboxylic acid ester groups are not established substances in large-scale chemical industry, but have to be made specially for these types of dyestuffs, which as a rule is so expensive as to be uneconomic. It has, therefore, not been possible to satisfy, by means of the above-mentioned types of dyestuff, the need to employ disperse dyestuffs which can be discharged to give pure white under relatively mild discharge conditions in the process for discharge reserve printing on hydrophobic textile materials.

It has now been found, surprisingly, that the difficulties in carrying out discharge reserve printing on textile materials consisting entirely or predominantly of hydrophobic synthetic fibres, can be overcome if these materials are impregnated in a manner which is in itself known with dye liquors containing, in addition to customary dyeing and padding auxiliaries, dyestuffs which can be discharged to white and, if appropriate, dyestuffs which are resistant to discharging agents, if the impregnated fabrics are dried or incipiently dried and then printed in the desired design with a discharge reserve paste which, in addition to the discharging agent, also contains, if desired, a dyestuff which is resistant to discharging agents, and if dyestuffs of the formula I

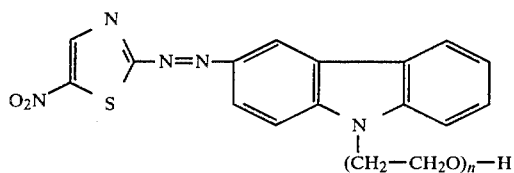

wherein n denotes a number from 1 to 9, preferably 1 to 5, are employed as the dyestuffs which are dischargeable to white. It is advantageous, particularly in view of the depth of colour which can be achieved, to employ mixtures of several, as a rule 2 to 4, dyestuffs of the formula I, the proportions of the individual dyestuffs being appropriately between 5 and 95%, particularly between 10 and 40%.

It is particularly preferable to employ mixtures of dyestuffs of the formula I wherein n is a number between 1 and 5. Large numbers of bases are known which are present in the discharge reserve printing pastes as discharging agents and which produce a pH value of at least 8 in a 5% strength aqueous solution. Examples of such bases are the hydroxides of the alkali and alkaline earth metals, salts of alkaline earth and alkali metals with weak organic or inorganic acids, ammonia or aliphatic amines, such as, for example, triethylamine, tripropylamine, tributylamine, ethanolamine, dimethylethanolamine, diethylethanolamine, diethanolamine, methyldiethanolamine, ethyldiethanolamine, propyldiethanolamine or triethanolamine. The bases customarily employed are alkaline earth metal hydroxides, such as, for example, calcium hydroxide, alkali metal hydroxides, such as, for example, sodium hydroxide or potassium hydroxide, or alkali metal salts of weak inorganic acids, such as, for example, an alkali metal carbonate or a tri-alkali metal phosphate. The base preferably used in the discharge reserve printing pastes is sodium hydroxide or potassium hydroxide or sodium carbonate or potassium carbonate or sodium bicarbonate or potassium bicarbonate.

The process according to the invention is carried out in a manner which is in itself known by padding the textile materials with dye liquors containing one or more dyestuffs of the formula I in addition to the known customary dyeing auxiliaries, such as, for example, dispersing agents, wetting agents, anti-foaming agents and padding auxiliaries, and squeezing out the padded fabric webs to a liquor pick-up of 50 to 120%. The fabric webs are then dried by means of warm air, preceded by infrared radiation if necessary, the temperature being approx. 80° C.—up to a maximum of about 150° C.—the time being shortened correspondingly. The fabric webs which have been prepared in this way are then printed with a discharge reserve printing paste containing, as the discharging agent, one of the bases described in greater detail above and also the known additives which are customary in printing pastes for textile printing, particularly thickeners. The padded and printed fabric webs are then subjected to a heat treatment at between 100° and 230° C. Within the lower temperature range from about 100° to 190° C., the supply of heat is preferably effected by means of superheated steam. For heat treatments carried out at between 160° and 230° C., it is preferable to use hot air as the heat transfer agent. After the heat treatment, which has the result of fixing the disperse dyestuffs and of destroying the dyestuffs of the formula I on the areas printed with the discharge reserve printing paste, the textiles are subjected to an after-treatment in the manner customary for polyester, are given a hot and cold rinse and are dried. A special embodiment of the process according to the invention consists in the padding liquor additionally containing, besides dyestuffs of the formula I, dyestuffs which are resistant to alkali and are thus not destroyed by the alkaline discharge reserve printing pastes which are to be employed in accordance with the invention. If the procedure followed is in other respects as indicated above, multicoloured designs are obtained. A further embodiment of the process according to the invention consists in not applying the dyestuffs of the formula I to the whole fabric by padding with a padding liquor, but printing them similarly on the fabric in the form of printing pastes and then after-printing the fabric with the discharge reserve printing paste. The textile prints are then fixed and finished as already described above. In this process too, it is possible to add dyestuffs which are alkali-resistant to the colour printing pastes which are printed on initially. In this case too, multi-coloured designs are obtained. A further possible means of carrying out the process according to the invention consists in printing, on the ground which has been padded or printed with dyestuffs of the formula I, discharge reserve printing pastes which in turn contain alkali-resistant dyestuffs. Here too, multi-coloured designs are obtained if the textile materials are subsequently fixed and finished as described above.

The dyestuffs of the formula I are present in the padding liquors or in the printing pastes in a finely divided form, such as is customary and known for disperse dyestuffs. The preparation of the padding liquors or printing pastes which are to be employed in accordance with the invention is also effected in a manner which is in itself known by mixing the constituents of the liquors or printing pastes, respectively, with the necessary quantity of water and liquid, finely disperse or solid, redispersible formulations of the dyestuffs of the formula I.

Alkali-resistant disperse dyestuffs which can be combined with the dyestuff of the formula I in order to produce multi-coloured designs are the known commercial dyestuffs belonging to the group comprising the azo or azomethine, quinophthalone, nitro or anthraquinone dyestuffs. The following are some examples of alkali-resistant disperse dyestuffs:

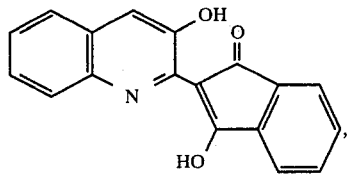

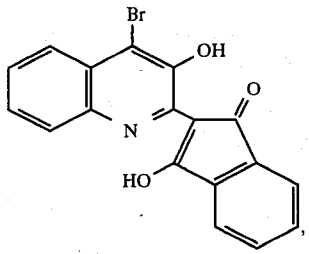

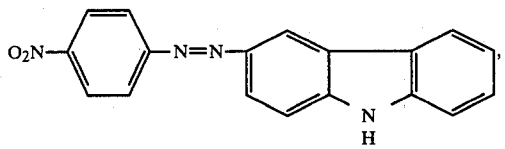

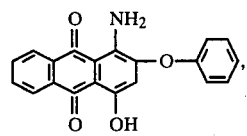

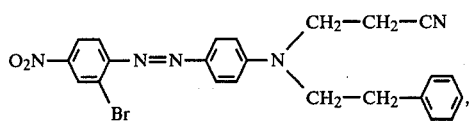

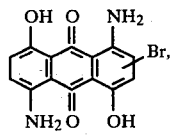

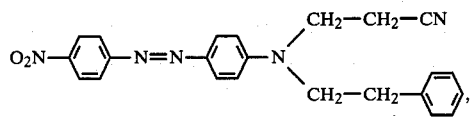

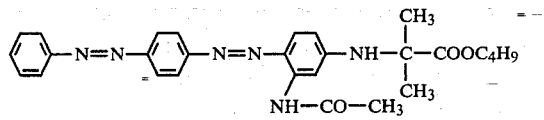

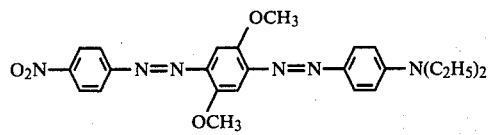

Some of the disperse dyestuffs of the formula I which are employed in accordance with the invention have already been disclosed in U.S. Pat. No. 3,787,178. Insofar as the dyestuffs are not mentioned or embraced in the said publication, they can, nevertheless, be prepared in full analogy with the process of preparation described in that publication, by diazotising the amine of the formula II

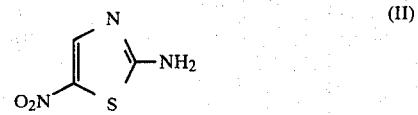

in a manner which is in itself known and coupling the product with a coupling component or a mixture of several coupling components of the formula III

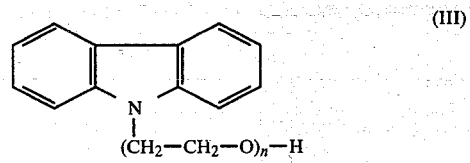

wherein n has the abovementioned meaning.

The diazotisation of the amine of the formula II can be effected, for example, as follows:

1 to 1.1 equivalents of an aqueous solution of sodium nitrite are added to a solution or suspension of the amine of the formula II in an aqueous, strong inorganic acid. The amine of the formula II can also be dissolved or suspended in an organic acid, such as, for example, acetic acid or propionic acid, or a mixture of these acids, and can be diazotised by adding nitrosylsulphuric acid. The resulting solution or suspension of the diazo compound is then combined, at temperatures from −20° to +30° C., preferably −10° to +10° C., with a solution of the coupling component III in water containing an acid and/or an organic compound which is partially or completely soluble in water, such as, for example, isobutanol or acetone, or in acetic acid or aqueous acetic acid. If necessary, sulphamic acid or urea is added to the coupling solution in order to destroy the excess nitrous acid. When the coupling reaction is complete, which can, if desired, be facilitated by adding bases, such as, for example, sodium acetate, the dyestuff of the formula I is isolated in the customary manner.

The coupling components of the formula III required for the preparation of the dyestuffs to be employed in accordance with the invention can be prepared by known processes, for example by reacting carbazole with ethylene oxide or ethylene chlorohydrin in the presence of ketones (British Patent Specification No. 620,733; J. Amer. Chem. Soc. 70, page 3,019 (1948); German Offenlegungsschrift No. 2,354,326; CA 63, page 565 (1965) and CA 81, page 25,550 (1974)), or by reacting the starting materials in organic solvents, such as, for example, dimethyl sulphoxide. A particularly advantageous method of preparing the coupling components of the formula III consists in reacting carbazole with an epoxide of the formula IV or a chlorohydrin of the formula V

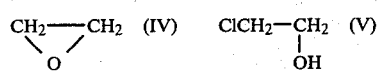

in an organic solvent which is not miscible with water at temperatures from 20° to 150° C., in the presence of a base and a phase transfer catalyst.

The process according to the invention is effected by reacting the reactants with one another under the abovementioned reaction conditions according to the invention, in a multi-phase system consisting of a liquid, non-aqueous phase and one or more solid phases.

As a rule, carbazole, in a dissolved or undissolved state, and the undissolved base are initially introduced in a system consisting of solvent and phase transfer catalyst, and the epoxide or chlorohydrin is then metered in.

Compounds having different values of n can be obtained by varying the molar ratio carbazole:epoxide or chlorohydrin. In theory, the values of n in the compound I which are indicated in the following table are obtained at the carbazole:ethylene oxide molar ratios indicated:

| Molar ratio Carbazole:epoxide | n |
|---|---|
| 1:1 | 0 |
| 1:2 | 1 |
| 1:3 | 2 |
| 1:4 | 3 |
| 1:5 | 4 |

Liquid, aliphatic or aromatic hydrocarbons, such as, for example, ligroin, low-boiling and high-boiling petroleum fractions, toluene, ortho-, meta- or para-xylene, monochlorobenzene, ortho-, meta- or para-dichlorobenzene or ortho-, meta- or para-chlorotoluene, are used as the organic solvents which are not miscible with water.

The bases employed are compounds which are capable of effecting at least a partial conversion of carbazole, in equilibrium, into its anion. Examples of such bases are alkali metal hydroxides or alkali metal hydrides.

The quantity of phase transfer catalyst to be employed is appropriately 2 to 20 mol%, relative to the quantity of carbazole. It is preferable to employ 4 to 15 mol%, particularly 10 to 15 mol%, of the phase transfer catalyst. A summarising review of suitable phase transfer catalysts is to be found, for example, in the book by W. P. Weber and G. W. Gokel, Phase Transfer Catalysis in Organic Synthesis, Springer Verlag, Berlin and New York 1977.

The following are examples of coupling components of the formula III

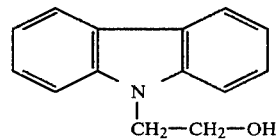

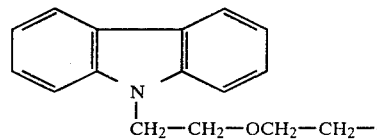

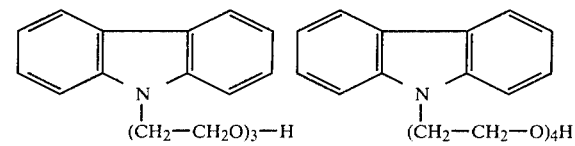

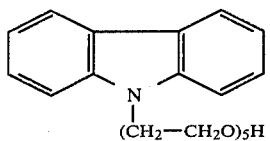

EXAMPLE 1

30 parts of the dyestuff of the formula IV

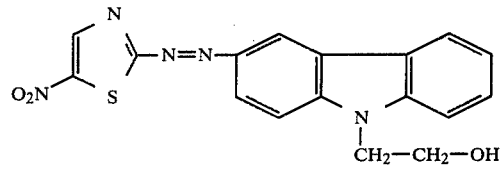

are added, in a finely divided state, to a padding liquor containing, per 1,000 parts, 937 parts of water, 3 parts of monosodium phosphate, 10 parts of sodium chlorate and 20 parts of a polymerisation product based on acrylic acid, as an antimigration agent. After drying, the goods are after-printed with a printing paste containing, per 1,000 parts, 600 parts of a 10% strength aqueous locust bean flour ether thickener, 120 parts of water, 80 parts of sodium carbonate, 100 parts of polyethylene glycol 400 and 100 parts of glycerol. After fixing with superheated steam for 7 minutes at 175° C., reductive after-treatment, soaping and subsequent rinsing and drying, a ruby-coloured print is obtained, which has a very good fastness properties, above all good fastness to light, fixing by dry heat, rubbing and washing. A very good white ground, having sharp outlines, is obtained on the areas on which the printing paste containing sodium carbonate has been printed.

EXAMPLE 2

Instead of 30 parts of the dyestuff of Example 1, 20 parts of the mixture of dyestuffs of the formula V

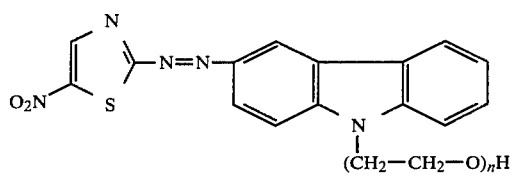

wherein n has the following values:
50% = 1
35% = 2
10% = 3
5% = 4, are used and the procedure followed is in other respects as indicated in Example 1. This gives a ruby-coloured print which has very good coloristic properties, particularly good fastness to light, fixing by dry heat, rubbing and washing, and has a very good white ground, having sharp outlines, on the discharged areas.

What is claimed is:

1. In the process for the production of white or variously colored designs on a colored substrate on textile materials containing hydrophobic, synthetic fibers by impregnating the materials with dye liquors containing dyeing and padding auxiliaries as well as dyestuffs dischargeable to white, drying or incipiently drying the impregnated materials and then printing a desired pattern onto the materials with a discharge reserve paste containing a discharging agent, and subsequently subjecting the materials to a heat treatment at temperatures from 100° to 230° C., the improvement comprises the dyestuffs dischargeable to white being dyestuffs of the formula

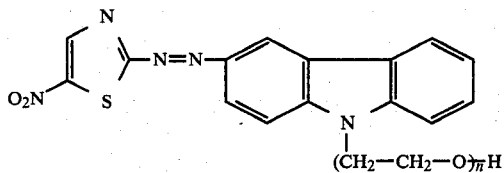

wherein n is a number from 1 to 9; and said discharging agent being a base which produces a pH value of at least 8 in a 5% strength aqueous solution.

2. The process according to claim 1 wherein said formula for the dyestuffs dischargeable to white is one wherein n is a number from 1 to 5.

3. The process according to claim 1 or claim 2 wherein the dyestuffs dischargeable to white are a mixture of at least two dyestuff species of the formula.

4. The process according to claim 1 wherein said base is alkali metal hydroxides, carbonates or bicarbonates.

5. The process according to claim 4 wherein said base is $Na_2CO_3$.

6. The process according to claim 1 wherein said dye liquor additionally contains dyestuffs which are resistant to the discharging agents.

7. The process according to claim 1 or claim 6 wherein said discharge reserve paste additionally contains dyestuffs which are resistant to the discharging agents.

8. The process according to claim 1 wherein said hydrophobic, synthetic fibers are polyester fibers.

* * * * *